US008050428B2

(12) United States Patent
Lv

(10) Patent No.: US 8,050,428 B2
(45) Date of Patent: Nov. 1, 2011

(54) AUDIO SIGNAL TRANSMISSION CIRCUIT

(75) Inventor: Teng Lv, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1120 days.

(21) Appl. No.: 11/834,704

(22) Filed: Aug. 7, 2007

(65) Prior Publication Data

US 2008/0281446 A1 Nov. 13, 2008

(30) Foreign Application Priority Data

May 11, 2007 (CN) .......................... 2007 1 0200604

(51) Int. Cl.
*G06F 17/00* (2006.01)

(52) U.S. Cl. ........ 381/120; 381/111; 381/112; 381/113; 700/94

(58) Field of Classification Search .................. 381/120, 381/121, 123, 94.5, 111, 112, 113; 700/94; 330/260
See application file for complete search history.

(56) References Cited

U.S. PATENT DOCUMENTS 5,910,991 A * 6/1999 Farrar ............................ 381/59
6,185,627 B1 * 2/2001 Baker et al. ...................... 710/1
6,359,987 B1 * 3/2002 Tran et al. ........................ 381/58
6,928,175 B1 * 8/2005 Bader et al. ...................... 381/123
6,954,675 B2 * 10/2005 Chu et al. ......................... 700/94
7,142,679 B2 * 11/2006 Santiago et al. ................. 381/123
7,574,011 B2 * 8/2009 Meyer et al. ...................... 381/113
2003/0023329 A1 * 1/2003 Brooks et al. .................... 700/94
2006/0089735 A1 4/2006 Atkinson

OTHER PUBLICATIONS

ST_TDA2005, Oct. 1998, User Guide.*
Creative Sound Blaster Live! Digital Entertainment 5.1 Creative Audio Software, Oct. 2000,User Guide.*

* cited by examiner

*Primary Examiner* — Davetta W Goins
*Assistant Examiner* — Kuassi Ganmavo
(74) *Attorney, Agent, or Firm* — Altis Law Group, Inc.

(57) ABSTRACT

An exemplary audio signal transmission circuit includes a codec to provide analog and digital audio signals; an amplifier connected to the codec to receive the analog audio signals; a control circuit connected to the codec to receive the digital audio signals and connected to the amplifier to selectively turn off the amplifier; a front audio port connected to the amplifier to receive amplified analog audio signals generated by the amplifier; and a rear audio port connected to the amplifier and the control circuit to selectively receive the amplified analog audio signals or the digital audio signals. The control circuit and the front audio port are turned off when the rear audio port is connected to an analog system, and the amplifier and the front audio port are turned off when the rear audio port is connected to a digital system.

8 Claims, 3 Drawing Sheets

AUDIO SIGNAL TRANSMISSION CIRCUIT

BACKGROUND

1. Field of the Invention

The present invention relates to signal transmission circuits, and particularly to an audio signal transmission circuit.

2. Description of Related Art

Many conventional multimedia computers include a two-channel (stereo) multimedia computer audio system. Typically, a conventional two-channel multimedia computer audio system includes a rear audio interface typically used for headphones, lineout, or microphone, and two wide-band audio transducers or speakers as a front audio. Once a user plugs into the rear audio interface jack, the front audio (audio transducers or speakers) should be muted so that users do not hear anything from the front audio.

SUMMARY

An exemplary audio signal transmission circuit includes a codec to provide analog and digital audio signals; an amplifier connected to the codec to receive the analog audio signals; a control circuit connected to the codec to receive the digital audio signals and connected to the amplifier to selectively turn off the amplifier; a front audio port connected to the amplifier to receive an amplified analog audio signal generated by the amplifier; and a rear audio port connected to the amplifier and the control circuit to selectively receive the amplified analog audio signal or the digital audio signal, wherein the control circuit and the front audio port are turned off when the rear audio port is connected to an analog system, and the amplifier and the front audio port are turned off when the rear audio port is connected to a digital system.

Other advantages and novel features will become more apparent from the following detailed description when taken in conjunction with the accompanying drawings, in which:

DETAILED DESCRIPTION OF THE INVENTION

Figure 1:
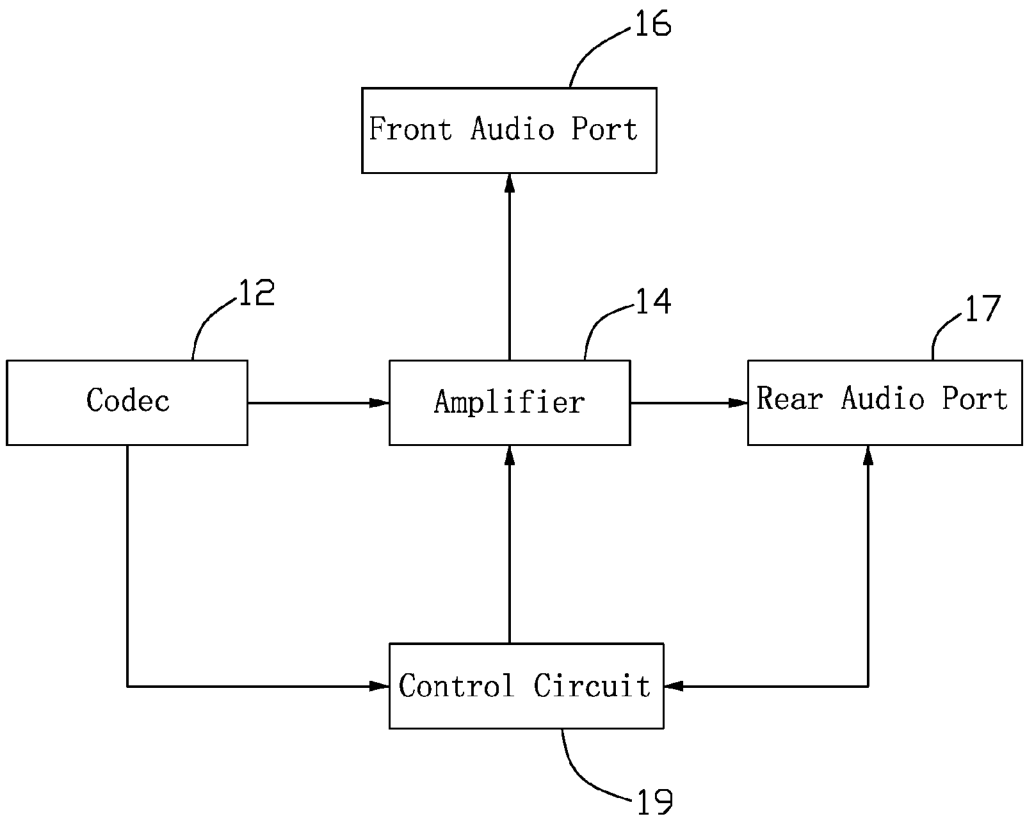
FIG.1 is a block diagram of one embodiment of an audio signal transmission circuit in accordance with the present invention comprising an amplifier, a control circuit, a front audio port, and a rear audio port.

Referring to FIG. 1, an audio signal transmission circuit in accordance with an embodiment of the present invention includes a codec 12 to provide an analog audio signal and a digital audio signal; an amplifier 14 connected to the codec 12 to receive the analog audio signal; a control circuit 19 connected to the codec 12 to receive the digital audio signal and connected to the amplifier 14 to selectively turn off the amplifier; a front audio port 16 connected to the amplifier 14 to receive an amplified analog audio signal generated by the amplifier 14; and a rear audio port 17 connected to the amplifier 14 and the control circuit 19 to selectively receive the amplified analog audio signal and the digital audio signal.

Figure 2:
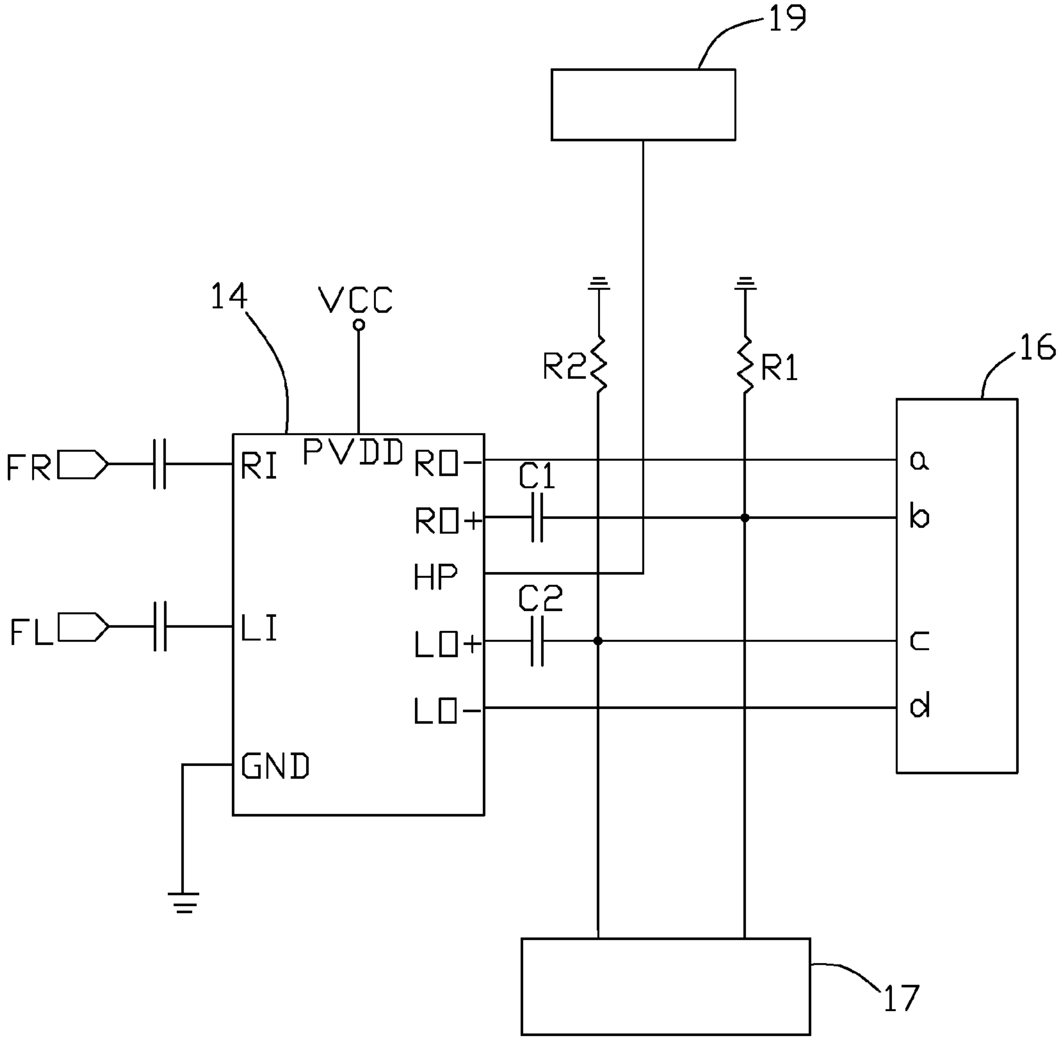
FIG.2 is a circuit diagram of the amplifier and the front audio port of FIG.1.

Referring to FIG. 2, the amplifier 14 includes two input terminals RI and LI, a control terminal HP, two output terminals RO+ and LO+, and two output feedback terminals RO− and LO−. The input terminals RI and LI are connected to the codec 12 to receive the analog audio signal divided into a right-channel FR and a left-channel FL respectively. The control terminal HP is connected to the control circuit 19. The output terminal RO+ is grounded via a capacitor C1 and a resistor R1, and the output terminal LO+ is grounded via a capacitor C2 and a resistor R2. The front audio port 16 includes four signal terminals a~d. The signal terminals b and c are connected to the output terminals RO+ and LO+ of the amplifier via the capacitors C1 and C2 respectively, and the signal terminals a and d are connected to the output feedback terminals RO− and LO− of the amplifier respectively to form two audio signal loops with the output terminals RO+ and LO+. The front audio port 16 receives the amplified analog audio signals when a voltage of the output feedback terminals RO− and LO− are at low level. The voltage of the output feedback terminals RO− and LO− are controlled by the control terminal HP, wherein the voltage of the output feedback terminals RO− and LO− fall to a low level when the control terminal HP receives a low level signal from the control circuit 19.

Figure 3:
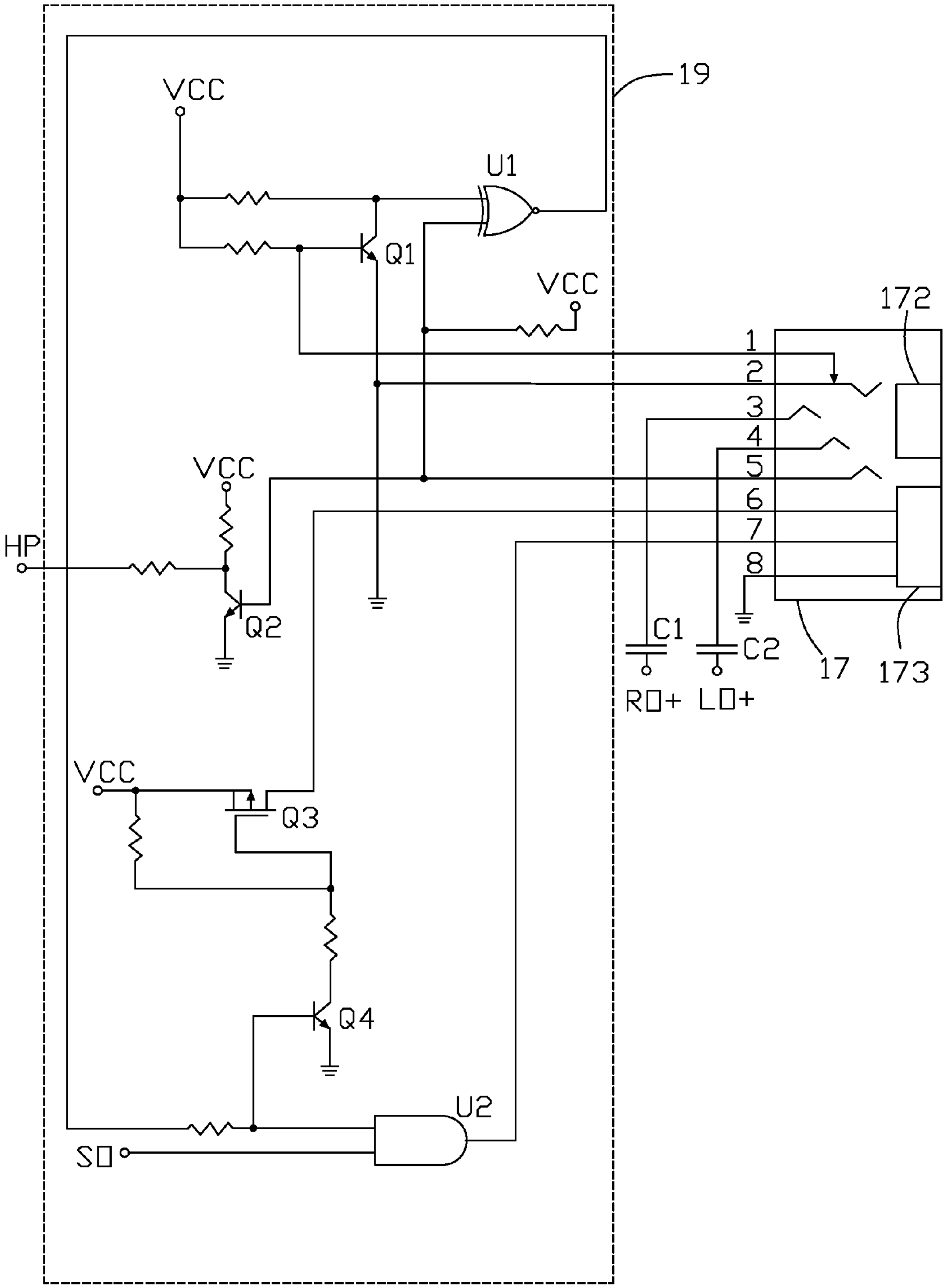
FIG.3 is a circuit diagram of the control circuit and the rear audio port of FIG. 1.

Referring to FIG. 3, the rear audio port 17 includes a first interface 172, a second interface 173, a grounded reference terminal 2, a first feedback terminal 5, and a second feedback terminal 1. The first interface 172 is used to connect to an analog system. The first interface 172 has two input terminals 3 and 4 respectively connected to the output terminals RO+ and LO+ of the amplifier 14 via corresponding capacitors C1 and C2. The second interface 173 is used to connect to a digital system. The second interface 173 has a power terminal 6, a data terminal 7, and a ground terminal 8. The first and the second feedback terminals 5 and 1 are elastically deformed by a plug of the analog system to contact the reference terminal 2 for turning off the control circuit when the first interface 172 is connected to the analog system. The first feedback terminal 5 is elastically deformed by a plug of the digital system to contact the reference terminal 2 for turning off the amplifier 14 when the second interface 173 is connected to the digital system.

The control circuit includes an XNOR gate U1, an AND gate U2, and four transistors Q1~Q4 functioning as four electric switches. In this embodiment, the transistors Q1, Q2, and Q4 are NPN transistors, and the transistor Q3 is a MOSFET. The XNOR gate U1 has a first input terminal connected to a power source VCC, a second input terminal connected to the power source VCC and the first feedback terminal 5 of the rear audio port 17, and an output terminal connected to the AND gate U2. The AND gate U2 has a first input terminal connected to the output terminal of the XNOR gate U1, a second input terminal connected to the codec 12 to receive the digital audio signal SO, and an output terminal connected to the data terminal 7 of the second interface 173 of the rear audio port 17. A base of the transistor Q1 is connected to the power source VCC and the second feedback terminal 1 of the rear audio port 17, an emitter of the transistor Q1 is grounded, and a collector of the transistor Q1 is connected to the first input terminal of the XNOR gate U1. A base of the transistor Q2 is connected to the first feedback terminal 5 of the rear audio port 17, an emitter of the transistor Q2 is grounded, and a collector of the transistor Q2 is connected to the power source VCC and the control terminal HP of the amplifier 14. A gate of the MOSFET Q3 is connected to the power source VCC, a source of the MOSFET Q3 is connected to the power source VCC, and a drain of the MOSFET Q3 is connected to the power terminal 6 of the second interface 173 of the rear audio port 17. A base of the transistor Q4 is connected to the output terminal of the XNOR gate U1, an emitter of the transistor Q4 is grounded, and a collector of the transistor Q4 is connected to the gate of the MOSFET Q3.

When the rear audio port 17 is idle, the transistor Q2 is turned on to ground the control terminal HP of the amplifier 14. Therefore, the voltage of the output feedback terminals RO− and LO− of the amplifier 14 are in a low level to form two audio signal loops with the output terminals RO+ and LO+ of the amplifier 14 for providing the amplified analog audio signal to the front audio port16. At this time, the transistor Q1 is turned on, the XNOR gate U1 outputs a low level signal to turn off the transistor Q4, and the MOSFET Q3 is turned off. Therefore, the power terminal 6 of the second interface 173 is in a low level for safety.

When the first interface 172 of the rear audio port 17 is connected to the analog system, the first and the second feedback terminals 5 and 1 of the rear audio port 17 are elastically deformed by the plug of the analog system to contact the reference terminal 2 of the rear audio port 17. Therefore, the transistor Q2 is turned off raising the voltage of the control terminal HP of the amplifier 14, the voltage of the output feedback terminals RO− and LO− of the amplifier 14 are high level to disable the front audio port 16. The amplified analog audio signal is transmitted to the input terminals 3 and 4 of the first interface 172. At this time, the transistor Q1 is turned off, the XNOR gate U1 outputs a low level signal to turn off the transistor Q4, and the MOSFET Q3 is turned off. Therefore, the power terminal 6 of the second interface 173 is low level for safety. The front audio port 16 is muted and the rear audio port 17 outputs analog audio signals.

When the second interface 173 of the rear audio port 17 is connected to the digital system, The first feedback terminal 5 of the rear audio port 17 is elastically deformed by the plug of the digital system to contact the reference terminal 2 of the rear audio port 17. Therefore, the transistor Q2 is turned off raising the voltage of the control terminal HP of the amplifier 14, the voltage of the output feedback terminals RO− and LO− of the amplifier 14 are high to disable the front audio port 16. The transistor Q1 is turned on, the XNOR gate U1 outputs a high level signal to turn on the transistor Q4, the MOSFET Q3 is turned on to provide power to the power terminal 5 of the second interface 173. Then, the digital audio signal SO is transmitted to the data terminal 7 of the second interface 173 via the AND gate U2. The front audio port 16 is muted and the rear audio port 17 outputs digital audio signals. The first interface 172 of the rear audio port 17 is idle and do not outputs analog audio signal.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An audio signal transmission circuit comprising:

a codec to provide analog audio signals and digital audio signals;

an amplifier connected to the codec to receive the analog audio signals, wherein the amplifier includes two input terminals connected to the codec to receive a left-channel and a right-channel of the analog audio signals respectively, and two output terminals to output amplified analog audio signals;

a control circuit connected to the codec to receive the digital audio signals and connected to the amplifier to selectively turn off the amplifier; and an output port connected to the amplifier and the control circuit to receive the analog audio signals and the digital audio signals, wherein the output port comprises:

a first interface configured to connect to the analog system, the first interface having two input terminals each connected to a corresponding output terminal of the amplifier via a capacitor, and grounded via a resistor;

a second interface configured to connect to the digital system, the second interface having a power terminal and a data terminal connected to the control circuit;

a grounded reference terminal;

a first feedback terminal connected to the control circuit; and a second feedback terminal connected to the control circuit, wherein the first and the second feedback terminals are elastically deformed by a plug of the analog system to contact the grounded reference terminal to turn off the control circuit when the first interface is connected to the analog system, and the first feedback terminal is elastically deformed by a plug of the digital system to contact the grounded reference terminal to turn off the amplifier when the second interface is connected to the digital system.

2. The audio signal transmission circuit as claimed in claim 1, wherein the control circuit comprises:

an XNOR gate having a first input terminal connected to a power source, a second input terminal connected to the power source and the first feedback terminal of the output port, and an output terminal;

an AND gate having a first input terminal connected to the output terminal of the XNOR gate, a second input terminal connected to the codec to receive the digital audio signals, and an output terminal connected to the data terminal of the second interface of the output port;

a first electric switch having a first terminal connected to the power source and the second feedback terminal of the output port, a second terminal grounded, and a third terminal connected to the first input terminal of the XNOR gate;

a second electric switch having a first terminal connected to the first feedback terminal of the output port, a second terminal grounded, and a third terminal connected to the power source and the control terminal of the amplifier;

a third electric switch having a first terminal connected to the power source, a second terminal connected to the power source, and a third terminal connected to the power terminal of the second interface of the output port; and a fourth electric switch having a first terminal connected to the output terminal of the XNOR gate, a second terminal grounded, and a third terminal connected to the first terminal of the third electric switch.

3. The audio signal transmission circuit as claimed in claim 2, wherein the first, second, and fourth electric switches are NPN transistors, and the third electric switch is a MOSFET.

4. An audio signal transmission circuit comprising:

a codec to provide analog audio signals and a digital audio signals;

an amplifier connected to the codec to receive the analog audio signals, wherein the amplifier comprises:

two input terminals connected to the codec to receive a right-channel and a left-channel of the analog audio signals respectively;

a control terminal;

two output terminals to output amplified analog audio signals; and two output feedback terminals controlled by the control terminal, wherein a voltage of the feedback terminals goes to low level when the control terminal receives a low level signal;

a control circuit connected to the codec to receive the digital audio signals and connected to the control terminal of the amplifier to selectively turn off the amplifier;

a front audio port connected to the amplifier to receive amplified analog audio signals generated by the amplifier; and a rear audio port connected to the amplifier and the control circuit to selectively receive the amplified analog audio signals or the digital audio signals, wherein when the rear audio port is connected to an analog system, the rear audio port outputs the amplified analog audio signals to the analog system and turns off the control circuit and the front audio port; when the rear audio port is connected to a digital system, the rear audio port outputs the digital audio signals to the digital system and turns off the amplifier and the front audio port; and when the rear audio port is idle the front audio port works and the control circuit is turned off.

5. The audio signal transmission circuit as claimed in claim 4, wherein the front audio port includes four signal terminals connected to the output terminals and the output feedback terminals of the amplifier respectively to form two audio signal loops, and the front audio port receives the amplified analog audio signals when the voltage of the feedback terminals are low level.

6. The audio signal transmission circuit as claimed in claim 5, wherein the rear audio port includes:

a first interface which can be used to connect to the analog system, the first interface having two input terminals each connected to the corresponding output terminal of the amplifier via a capacitor, and grounded via a resistor;

a second interface which can be used to connect to the digital system, the second interface having a power terminal and a data terminal connected to the control circuit;

a grounded reference terminal;

a first feedback terminal connected to the control circuit; and a second feedback terminal connected to the control circuit, wherein the first and the second feedback terminals elastically contact the reference terminal to turn off the control circuit when the first interface is connected to the analog system, and the first feedback terminal elastically contacts the reference terminal to turn off the amplifier when the second interface is connected to the digital system.

7. The audio signal transmission circuit as claimed in claim 6, wherein the control circuit includes:

an XNOR gate having a first input terminal connected to a power source, a second input terminal connected to the power source and the first feedback terminal of the output port, and an output terminal;

an AND gate having a first input terminal connected to the output terminal of the XNOR gate, a second input terminal connected to the codec to receive the digital audio signals, and an output terminal connected to the data terminal of the second interface of the output port;

a first electric switch having a first terminal connected to the power source and the second feedback terminal of the output port, a second terminal grounded, and a third terminal connected to the first input terminal of the XNOR gate;

a second electric switch having a first terminal connected to the first feedback terminal of the output port, a second terminal grounded, and a third terminal connected to the power source and the control terminal of the amplifier;

a third electric switch having a first terminal connected to the power source, a second terminal connected to the power source, and a third terminal connected to the power terminal of the second interface of the output port; and a fourth electric switch having a first terminal connected to the output terminal of the XNOR gate, a second terminal grounded, and a third terminal connected to the first terminal of the third electric switch.

8. The audio signal transmission circuit as claimed in claim 7, wherein the first, second, and fourth electric switches are NPN transistors, and the third electric switch is a MOSFET.

* * * * *